United States Patent
Steiner et al.

(10) Patent No.: US 7,431,268 B2
(45) Date of Patent: Oct. 7, 2008

(54) MANUAL TIRE CARRIER WITH TRAVEL SWITCH

(75) Inventors: Walter J. Steiner, Rochester Hills, MI (US); Charles Flynn, Davisburg, MI (US); Madhu Posani, Bloomfield Hills, MI (US); Rosanne Knox, Clinton Township, MI (US); John Truckey, Mancelona, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/936,269

(22) Filed: Sep. 8, 2004

(65) Prior Publication Data

US 2005/0082517 A1 Apr. 21, 2005

Related U.S. Application Data

(63) Continuation-in-part of application No. 10/723,694, filed on Nov. 26, 2003, now Pat. No. 7,028,989.

(60) Provisional application No. 60/429,843, filed on Nov. 27, 2002, provisional application No. 60/441,496, filed on Jan. 21, 2003.

(51) Int. Cl.
*B66D 1/00* (2006.01)
(52) U.S. Cl. ............... 254/323; 414/466; 224/42.23
(58) Field of Classification Search ............ 254/323, 254/375, 269–273, 362; 414/463–466, 909; 224/42.12, 42.23
See application file for complete search history.

(56) References Cited

U.S. PATENT DOCUMENTS

| | | | | | |
|---|---|---|---|---|---|
| 4,548,540 | A | * | 10/1985 | Renfro | 414/463 |
| 4,613,273 | A | * | 9/1986 | Wagner | 414/463 |
| 5,368,280 | A | * | 11/1994 | Ng | 254/376 |
| 5,398,911 | A | * | 3/1995 | Holster | 254/267 |
| 5,791,859 | A | * | 8/1998 | Simnacher | 414/463 |
| 6,554,253 | B1 | * | 4/2003 | Dobmeier et al. | 254/323 |
| 6,561,489 | B1 | * | 5/2003 | Wakefield | 254/323 |
| 6,692,216 | B2 | * | 2/2004 | Reznar et al. | 414/463 |
| 2002/0178501 | A1 | * | 12/2002 | Cook et al. | 5/611 |
| 2004/0188582 | A1 | * | 9/2004 | Flynn et al. | 248/329 |
| 2004/0265102 | A1 | * | 12/2004 | Reznar | 414/463 |

* cited by examiner

*Primary Examiner*—Evan H Langdon
(74) *Attorney, Agent, or Firm*—Richard M. Mescher; Porter, Wright, Morris.; Dean B. Watson

(57) ABSTRACT

A tire carrier assembly for storing a spare tire on a vehicle which includes a carrier adapted for supporting the spare tire and a winch operatively connected to the carrier to raise and lower the carrier between a stowed position wherein the carrier is inaccessible and a deployed position wherein the carrier is accessible. The winch has a flexible member secured to the carrier and one of an electric motor and a manual device which selectively raises and lowers the carrier between the stowed and deployed positions. A sensor is activated when the carrier is in the stowed position. A warning indicator is operably connected to the sensor so that the warning indicator is activated and provides the operator with a warning when the carrier is out of the stowed position and the sensor is not activated.

13 Claims, 17 Drawing Sheets

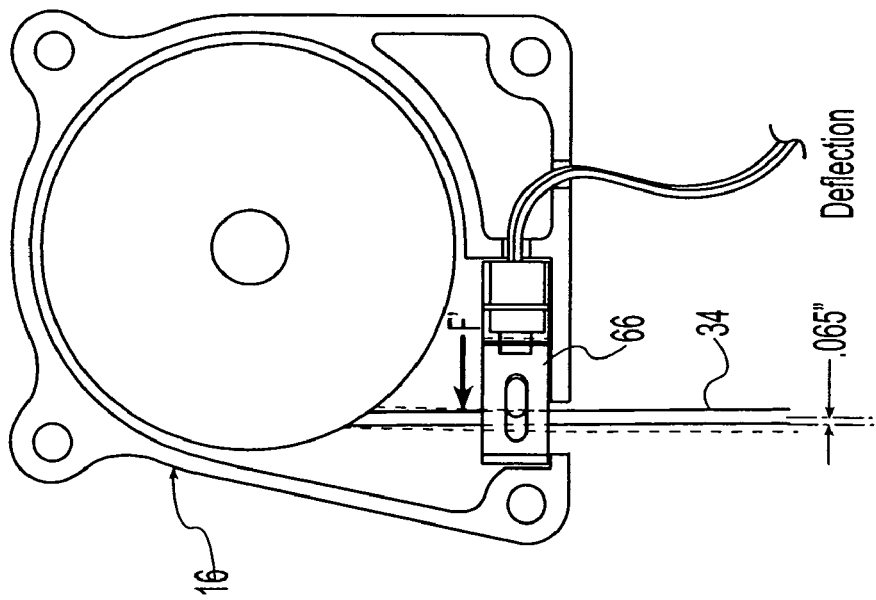
*Fig. 5C*
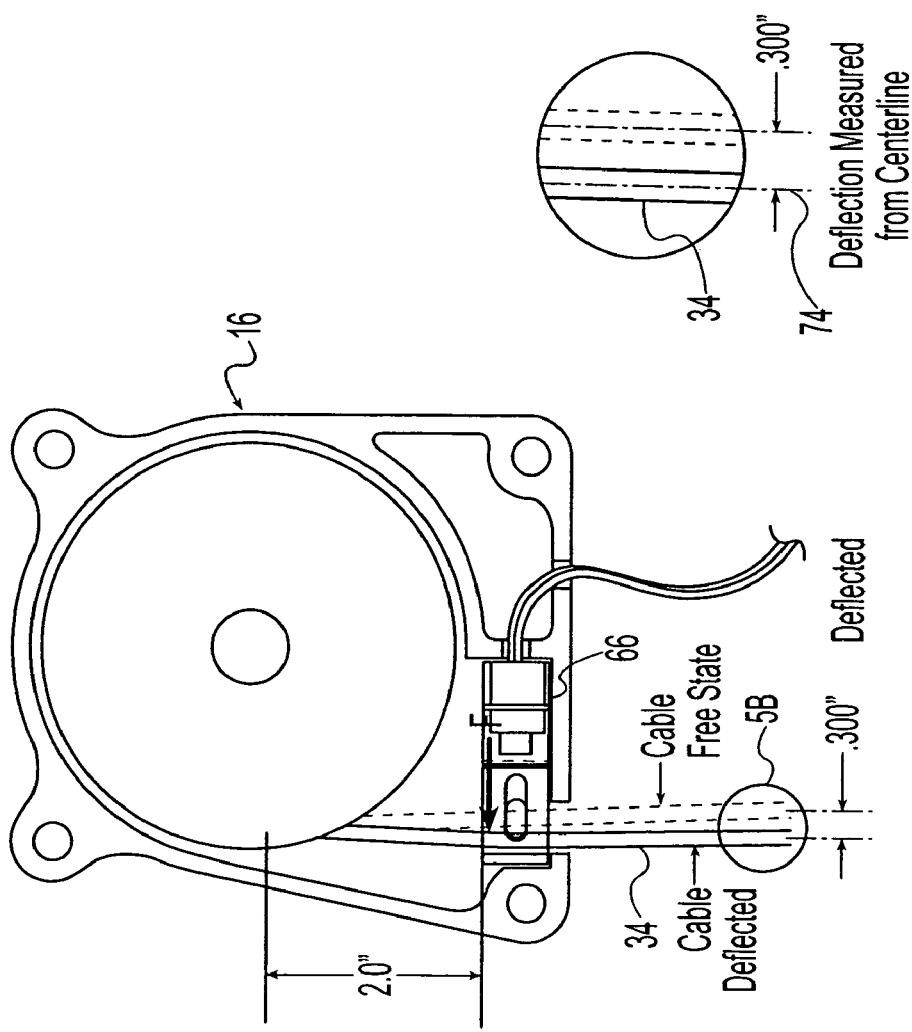
*Fig. 5B*
*Fig. 5A*

MANUAL TIRE CARRIER WITH TRAVEL SWITCH

CROSS-REFERENCE TO RELATED APPLICATIONS

This is a continuation-in-part of patent application Ser. No. 10/723,694 filed on Nov. 26, 2003 now U.S. Pat. No. 7,028,989 which claims the benefit of Provisional Patent Application No. 60/429,843 filed on Nov. 27, 2002 and provisional patent application No. 60/441,496 filed on Jan. 21, 2003, the disclosures of which are each expressly incorporated herein in their entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a tire carrier for a motor vehicle and, more particularly, to such a tire carrier which stores a spare tire beneath the motor vehicle.

BACKGROUND OF THE INVENTION

Vehicles with inflatable tires such as passenger cars, light and heavy duty trucks, tractor trailers, buses, commercial delivery vehicles, among other motorized forms of transportation and trailers pulled by such vehicles are conventionally equipped with spare tires. Some spare tires are stored under the vehicle using a tire carrier which includes a tire winch for raising and lowering the spare tire between a raised or stored position and a lowered or accessed position. The winch typically raises and lowers the spare tire using a flexible member such as a cable or cord which is wound and unwound on a spool or reel. A secondary latch is often provided to secure the spare tire in the stored position. If the flexible member or winch fails while the spare tire is in the stored position, the secondary latch ensures that the spare tire remains in the stored position.

Various powered tire carriers have been proposed for storing spare tires beneath a motor vehicle. See for example, U.S. Pat. Nos. 4,613,273, 5,368,280, 5,791,859, the disclosures of which are expressly incorporated herein in their entireties by reference.

While these prior tire carriers may adequately stow spare tires beneath motor vehicles under ordinary circumstances, several problems can arise. For example, the spare tire may not be properly located in the stowed position and it is difficult for the operator to see the problem because the spare tire is located beneath the motor vehicle. Additionally, even if the spare tire is properly stowed, the position of the spare tire can change over time such as, for example, due to cable stretching and it is difficult for the operator to see the problem since the spare tire is located below the motor vehicle. Furthermore, the condition of the spare tire itself can change over time such as, for example, loosing inflation and it is difficult for the operator to see the problem since the spare tire is located below the vehicle. Accordingly, there is a need form an improved tire carrier assembly.

SUMMARY OF THE INVENTION

The present invention provides a tire carrier assembly which overcomes at least some of the above-noted problems of the related art. According to the present invention, a tire carrier assembly includes, in combination, a carrier adapted for supporting the spare tire and a winch operatively connected to the carrier to raise and lower the carrier between a stowed position wherein the carrier is inaccessible and a deployed position wherein the carrier is accessible. A sensor is located to be activated when the carrier is in the stowed position. A warning indicator is operably connected to the sensor so that the warning indicator is activated when the carrier is out of the stowed position and the sensor is not activated.

According to another aspect of the present invention, a tire carrier assembly includes, in combination, a carrier adapted for supporting the spare tire, a winch operatively connected to the carrier to raise and lower the carrier between a stowed position wherein the carrier is inaccessible and a deployed position wherein the carrier is accessible and a manual device for operating the winch to raise and lower the carrier. A limit switch is located to be activated when the carrier is in the stowed position. A warning indicator is operably connected to the sensor so that the warning indicator is activated when the carrier is out of the stowed position and the limit switch is not activated.

According to another aspect of the present invention, a tire carrier assembly includes, in combination, a carrier adapted for supporting the spare tire, a winch operatively connected to the carrier to raise and lower the carrier between a stowed position wherein the carrier is inaccessible and a deployed position wherein the carrier is accessible, and a manual device for operating the winch to raise and lower the carrier. A proximity switch is located to be activated when the carrier is in the stowed position. A warning indicator is operably connected to the sensor so that the warning indicator is activated when the carrier is out of the stowed position and the limit switch is not activated.

From the foregoing disclosure and the following more detailed description of various preferred embodiments it will be apparent to those skilled in the art that the present invention provides a significant advance in the technology and art of tire carriers. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 5A is an enlarged and fragmented elevational view similar to FIG. 3 but showing example 1;

FIG. 5B is an enlarged view taken from circle 5B in FIG. 5A;

FIG. 5C is an enlarged and fragmented elevational view similar to FIG. 5A but showing example 2;

Figure 1:
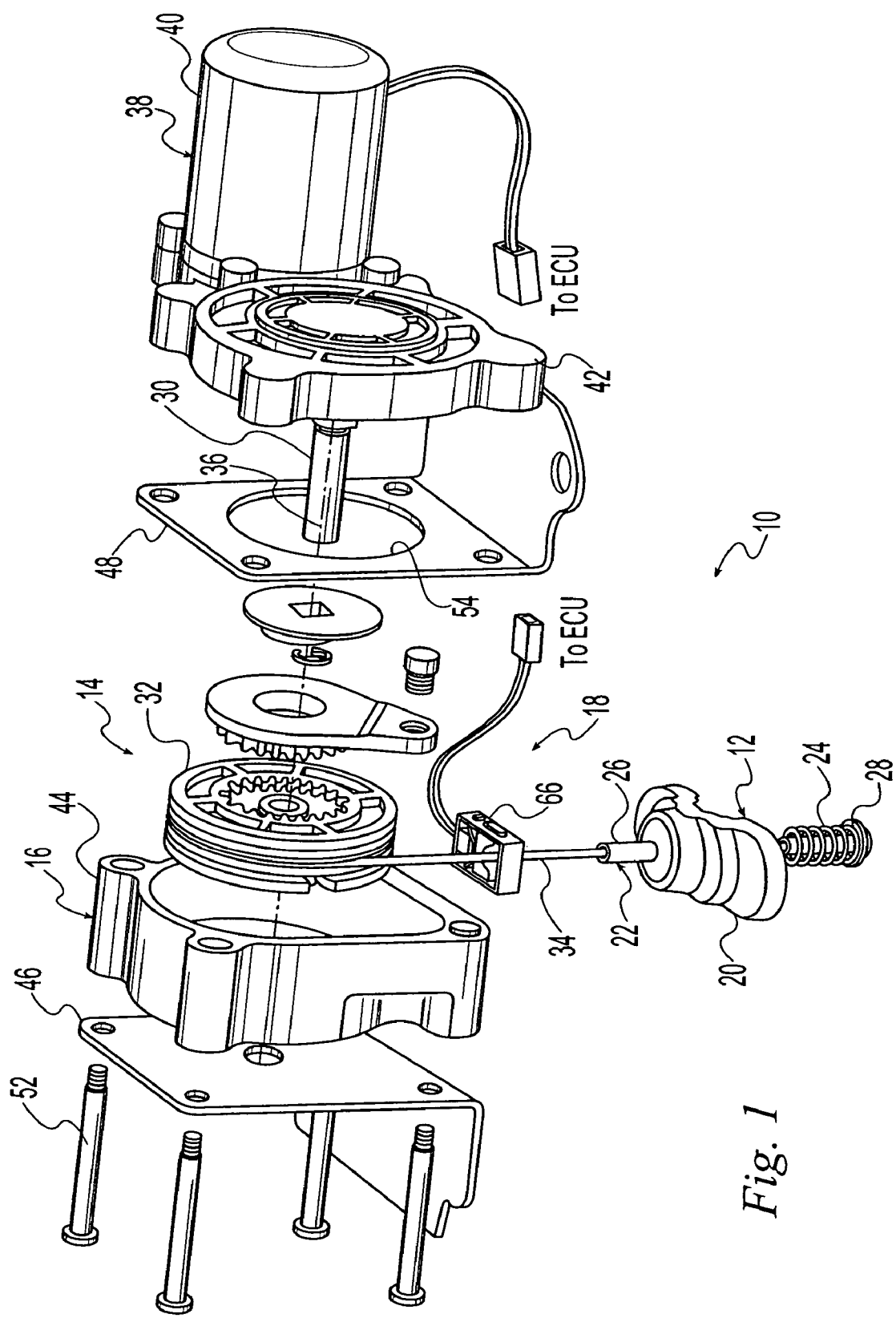
FIG. 1 is an exploded view of a tire carrier assembly according to a preferred embodiment of the present invention.

It should be understood that the appended drawings are not necessarily to scale, presenting a somewhat simplified representation of various preferred features illustrative of the basic principles of the invention. The specific design features of a tire carrier for a motor vehicle as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tire carriers illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the vehicle, and aft or rearward refers to a direction toward the rear of the vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved tire carriers disclosed herein. The following detailed discussion of various alternative and preferred embodiments will illustrate the general principles of the invention with reference to tire carriers for a motor vehicle such as a truck, van, or sport utility vehicle (SUV). Other embodiments suitable for other applications will be apparent to those skilled in the art given the benefit of this disclosure such as for example for use with automobiles, recreational vehicles, trailers, off road vehicles such as dune buggies, industrial equipment, golf carts, and the like.

Referring now to the drawings, FIG. 1 shows a tire carrier assembly 10 according to a preferred embodiment of the present invention. The illustrated tire carrier assembly 10 includes a tire carrier 12 for carrying and supporting a spare tire 11 thereon, a winch assembly 14 for raising and lowering the tire carrier 12 between an upper or storing position and a lower or accessing position, and a housing assembly 16 for at least partially housing the winch assembly 14 and mounting the various components to the motor vehicle. The illustrated tire carrier assembly 10 also includes a monitoring sensor or device 18 for monitoring operation of the tire carrier assembly 10 as described in more detail hereinafter. The storing position is preferably adjacent the bottom of the motor vehicle wherein access is not provided to the tire carrier 12 or the spare tire. The accessing position is preferably spaced below the storing position on or near the ground surface wherein access is provided to the tire carrier 12 and the spare tire 11 so that the spare tire can be placed on and removed from the tire carrier 12. Optionally, a secondary latch assembly (not shown) may be provided for securing or confining the tire carrier 12 in the storing position as disclosed in U.S. Pat. No. 6,267,546 or U.S. patent application Ser. No. 10/127,298 filed on Apr. 22, 2002, the disclosures of which are both expressly incorporated herein in their entireties by reference.

The tire carrier 12 includes a tire plate 20, a swivel 22, and a biasing member 24. The tire plate 20 is adapted for supporting the spare tire 11. The illustrated tire plate is adapted to support a wheel or rim 11a of the spare tire 11. It is noted that the tire plate 20 can have many different forms within the scope of the present invention. The swivel 22 vertically extends through the tire plate 20 and includes a tubular portion 26 which extends above the tire plate 20. The tubular portion 26 can take on many sizes and shapes depending on the application requirements and the interaction with other components as will be discussed hereinafter. The illustrated tubular portion 26 is cylindrical and extends longitudinally through the tire plate 20. The biasing member 24 biases the tire plate 20 in an upward direction to maintain tension as is known in the art. The illustrated biasing member 24 is a coil compression spring acting between a flange 28 and a lower side of the tire plate 20. Alternatively, the biasing member 24 can be a finger spring device, a resilient member such as an elastomeric member, a combination of a spring and elastomeric member, or the like.

The winch assembly 14 includes a shaft 30, a spool or reel 32 that is rotatably mounted on the shaft 30, and an elongate flexible member 34 which is wound and unwound upon the reel 32. The flexible member 34 can be a cable, rope chain, cord, or the like which is selectively wound onto and off of the reel 32. The shaft 30 extends outwardly from the housing assembly 16 and is mounted for rotation about its central axis 36. The reel 32 is mounted for rotation with the shaft 30 and is adapted to wind and unwind the flexible member 34 thereon upon rotation of the shaft by an actuation member 38. The illustrated actuation member is a motor 40 but other suitable means can be utilized such as for example a manually-operated device or the like. The motor 40 is operatively coupled to the shaft 30 through a gearbox 42 to increase the output torque and speed of rotation. When the motor 40 is not activated, a self-locking feature of the gearbox 42 prevents counter rotation of the reel 32 and undesirable movement of the tire carrier 12 from the storing position to the accessing position due to tire weight and/or tension force in the flexible member 34. Optionally, the motor 40 is coupled directly to the reel 32 so as to eliminate the gearbox 42. However, in this instance it is found advantageous that the motor 40 have a mechanical stop such as, for example, a solenoid activated brake or that the winch assembly 14 have a secondary lock to prevent the reel 32 from counter rotating and the tire carrier 12 from undesirably moving from the stowed position to the accessing position. The flexible member 34 has a first or upper end secured to the reel 32 and a second or lower end extending through the tubular portion 26 if the swivel 22 such that the tire plate 20 is raised to the stowing position and lowered to the accessing position as the flexible member 34 is wound and unwound on the reel 32 respectively. It is noted that any suitable winch assembly known in the art can be utilized within the scope of the present invention.

The housing assembly 16 includes a housing 44, a cover plate 46, and a mounting bracket or cover 48. The housing 44 is generally shaped and sized to enclose the reel 32 and the flexible member 34 within a hollow interior space or cavity. The housing 44 partially forms the cavity with an open side for insertion of the reel 32 therethrough when the cover plate 46 is not attached thereto. The housing 44 also has a passage 50 (FIG. 3) in its bottom wall to permit passage of the flexible member 34 from the reel 32 to the swivel 22. The illustrated cover plate 46 is generally planar and is adapted to be secured by conventional fasteners 52 through suitable apertures in bosses in the housing 44 to close the open side of the housing 44 when secured thereto. The fasteners 52 securing the cover plate 46 extend through apertures the bosses in the housing 44 to cooperate with the mounting bracket 48 and the gearbox 42. The mounting bracket 48 and the cover plate 46 are on opposite sides of the housing 44. The mounting bracket 48 includes a hole 54 to form a passage through which the shaft 30 can pass from the gearbox 42 to the reel 32. The housing 44, the cover plate 46 and the mounting bracket 48 may be made of any suitable material including thermoplastic, thermoset plastic, steel, aluminum, and composite materials.

The illustrated motor 40 is a permanent magnet direct current DC motor, which can selectively rotate in either direction depending on the provided control signal. Alternatively, the motor 40 may be a hydraulic, pneumatic or vacuum motor that is connected by conventional means to a corresponding supply source and regulation devices as are well known in the art.

Figure 2:
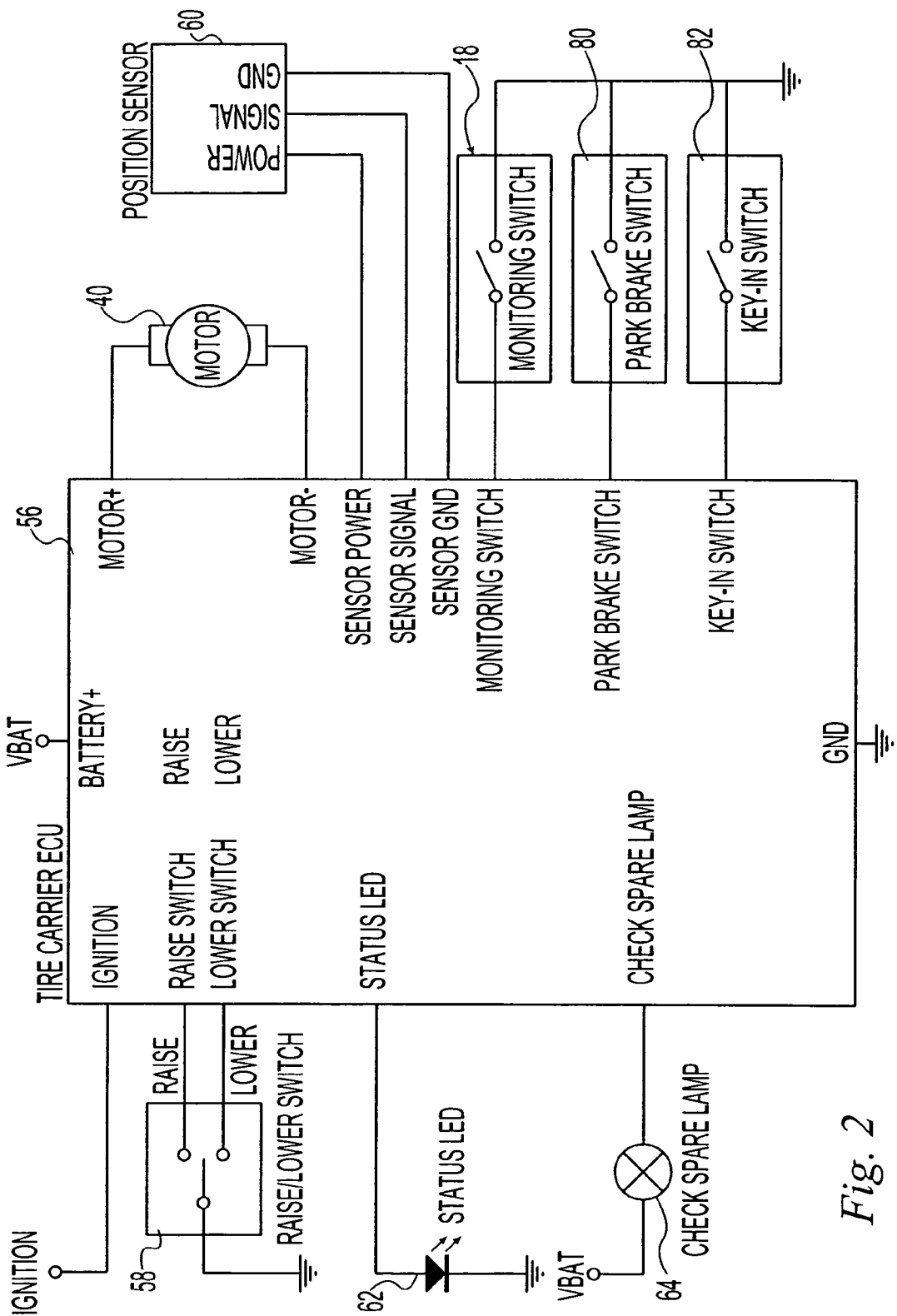
FIG. 2 is a schematic diagram of the electronic control unit (ECU) used to control operation of the tire carrier assembly of FIG. 1.

As shown in FIG. 2, operation of the motor 40 is controlled by the electronic control module (ECU) or controller 56, the monitoring device 18, and an operator-input device 58. The illustrated motor 40 is provided with a position sensor 60 for sensing rotations and providing electrical signals representative of the rotations. A suitable sensor 60 is a Hall-effect device or sensor or a non-contact rotary position sensor, such as a resolver or optical encoder and a sensor-less position control of the motor 40, such as a ripple current measuring device can be used. The position sensor 60 may be integral with the motor 40 or alternatively the position sensor 60 can be separate from the motor 40 and located at any suitable location such as on the shaft 30 or the reel 32. The sensor 60 is electrically connected in a suitable manner to the ECU 56 to provide signals to the ECU 56. Those skilled in the art will recognize that sensing rotations with a reel of known diameter enables the length of the flexible member which is wound or unwound from the reel 32 to be known. It is noted that suitable torque limiters and the like can also be provided in a well known manner.

The ECU 56 is provided with suitable logic and memory electronics for operating the motor 40 and the winch assembly 14. The operator input device 58 sends signals to the ECU 56 to rotate the reel 32 as desired to lower the tire carrier 12 from the storing position to the accessing position or raise the tire carrier 12 from an accessing position to the storing or stowed position. The illustrated operator input device 58 is a center-off momentary toggle switch. Alternatively, the input device 58 can include a rocker switch that is well known in the art or any other suitable type of switch or control device. Also preferably provided is a status indicator such as the illustrated light emitting diode (LED) device 62. The input device 58 and the LED device 62 can be mounted in a number of locations in the vehicle, such as, the dashboard, the rear jack location of a SUV or in a weather-tight enclosure on the outside of the vehicle. preferably, the input device 58 is biased to an off condition or position. When the operator toggles the center of switch of the input device 58 in one direction, it sends a signal to the ECU 56 to lower the tire carrier 12 to the accessing position. Toggling the switch of the input device 58 in the other direction sends a signal to the ECU 56 to raise the tire carrier to the storing or stowed position. While the tire carrier 12 is being lowered to the accessing position, the LED device 62 blinks and then stays illuminated while the tire carrier 12 is in the down condition. When the tire carrier 12 is being raised to the storing or stowed position, the LED device 62 blinks. The LED device 62 stays off when the tire carrier 12 is in the stored position. Any signal fault detected by the ECU 56 causes the status LED device 62 to illuminate, until the fault is cleared. Further optionally, warning indicator such as a check spare tire lamp 64 may be installed on the dashboard and a signal from the ECU 56 is sent to the lamp 64 in the event that the height of the spare tire 11 on the tire carrier 12 should be adjusted after the spare tire 11 was initially stored in the storing position. This would indicate to the driver that the spare tire 11 was loosing air pressure or the flexible member 34 has stretched.

The monitoring device 18 preferably limits upward or downward movement of the tire carrier 12 as it is being moved into and out of the storing position. The illustrated monitoring device 18 includes the position sensor 60 described hereinabove. The illustrated monitoring device 18 is adapted to stop the motor 40 after a predetermined flexible member travel or distance. The illustrated monitoring device 18 also includes a flexible member tension or deflection device 66 that is described in more detail hereinafter.

Travel of the flexible member 34 is indicated by the position sensor 60 when a predetermined number of rotations have been made by the motor 40 or by another rotating component such as the shaft 30. Signals from the position sensor 60 indicating the number of rotations of the motor 40 or the shaft 30 are sent to the ECU 56 for processing. The flexible member travel information is utilized to stop rotation of the motor 40 or the shaft 30 if the flexible member 34 travels a predetermined distance. The predetermined distance can be, for example, by way of non limiting example, a certain percentage (e.g. 5%) more than the flexible member 34 has traveled the previous time the tire carrier assembly 10 was used. When the predetermined distance is traveled, the ECU 56 causes the motor 40 to stop.

Figure 3:
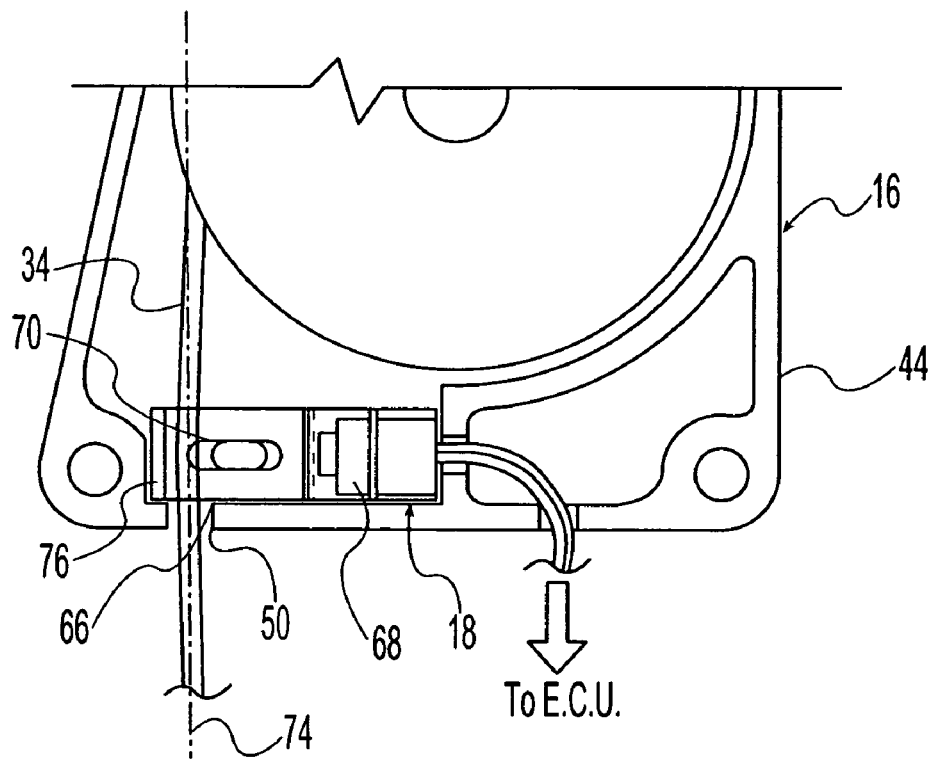
FIG. 3 is an enlarged and fragmented elevational view of a housing and tension device of the tire carrier assembly of FIGS. 1 and 2, wherein some components are removed for clarity.
Figure 4:
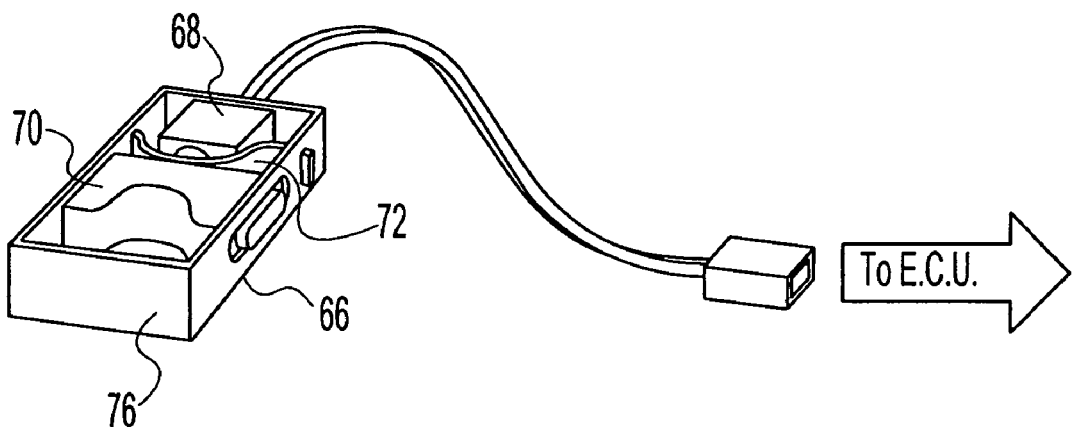
FIG. 4 is a perspective view of the tension device of FIG. 3.

The tension or deflection device 66 is used to monitor operation of the flexible member 34. As best shown in FIGS. 3 and 4, the illustrated tension device 66 is mounted in the cavity of the housing 44 such that the tension device 66 is aligned with the passage 50 in the bottom of the housing 44. The illustrated tension device 66 has a switch portion 68 and a spring-biased probe or guide portion 70 that is oriented substantially perpendicular to the switch portion 68. The probe portion 70 is resiliently biased by a biasing member 72 which can take various forms including a leaf spring, a coil spring, or the like. In the typical situation, that is with the tire rim 11*a* engaging the tire plate 20, the weight of the spare tire 11 and rim 11*a* on an extended length or stretched flexible member 34 forms a tension force in the flexible member 34. As the flexible member 34 is near the end of it retraction travel as determined by the position sensor 60, the tension device 66 is activated. The probe portion 70 is moved substantially perpendicular to the axis of travel 74 of the flexible member 34 until the biased probe portion 70 is pressed against the flexible member 34 to deflect the flexible member 34 a predetermined distance from its free state condition as best shown in FIGS. 5A, 5B and 5C. After the probe portion 70 moves the flexible member 34 to the deflected position, as tension increases in the flexible member 34, the probe portion 70 moves toward the switch portion 68. The deflection in the flexible member 34 from the axis of travel 74 is reduced because the tension force causes the flexible member 34 to move from the deflected position towards an undeflected condition or free state condition. The reduction in deflection is proportional to the tension force level in the flexible member 34. It is noted that the tension device 66 can take on many forms within the scope of the present invention including a contact switch, a potentiometer, and an on-off switch.

Figure 5D:
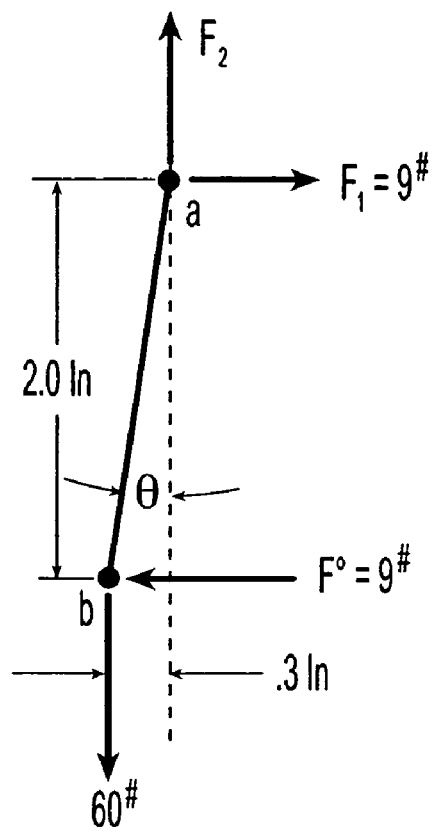
FIG. 5D is a free body force diagram for example 1 of FIG. 5A.
Figure 5E:
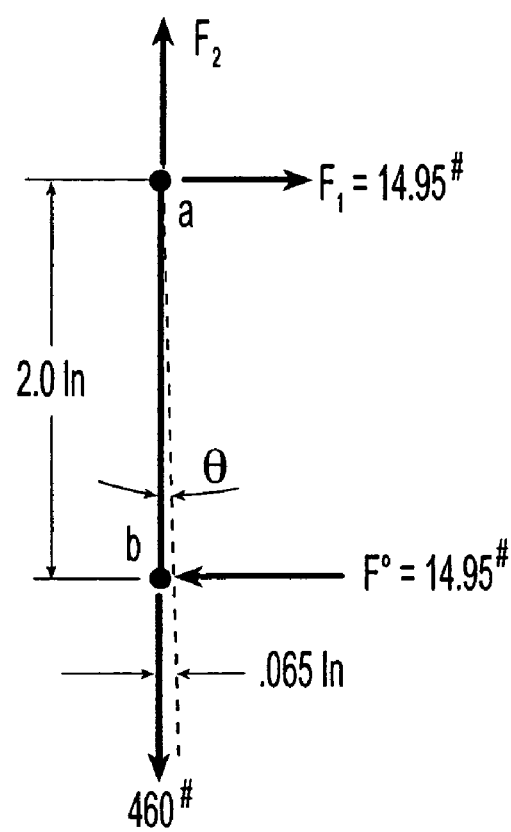
FIG. 5E is a free body force diagram for example 2 of FIG. 5C.
Figure 5G:
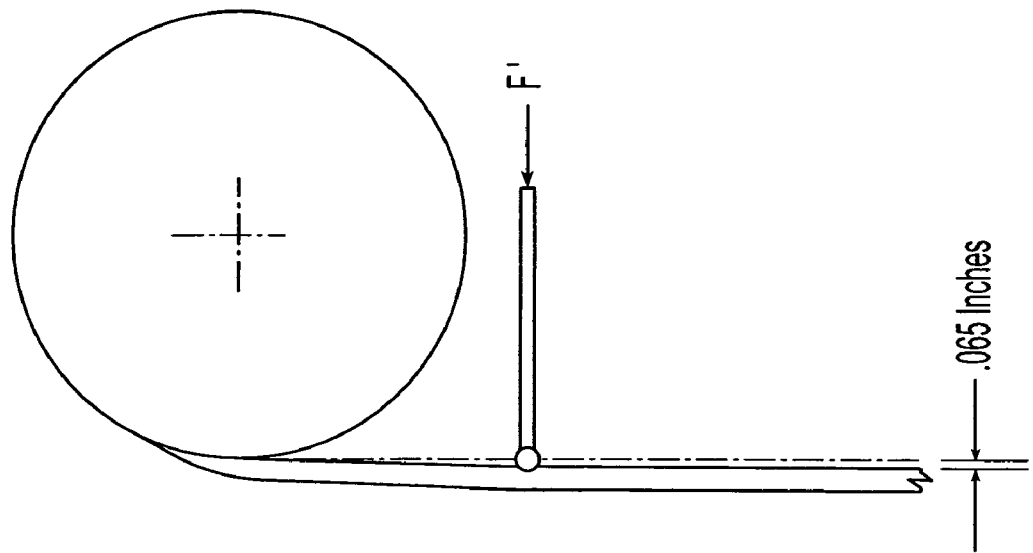
FIG. 5G diagrammatic view showing cable deflection for example 2 of FIGS. 5C and 5E.
Figure 5F:
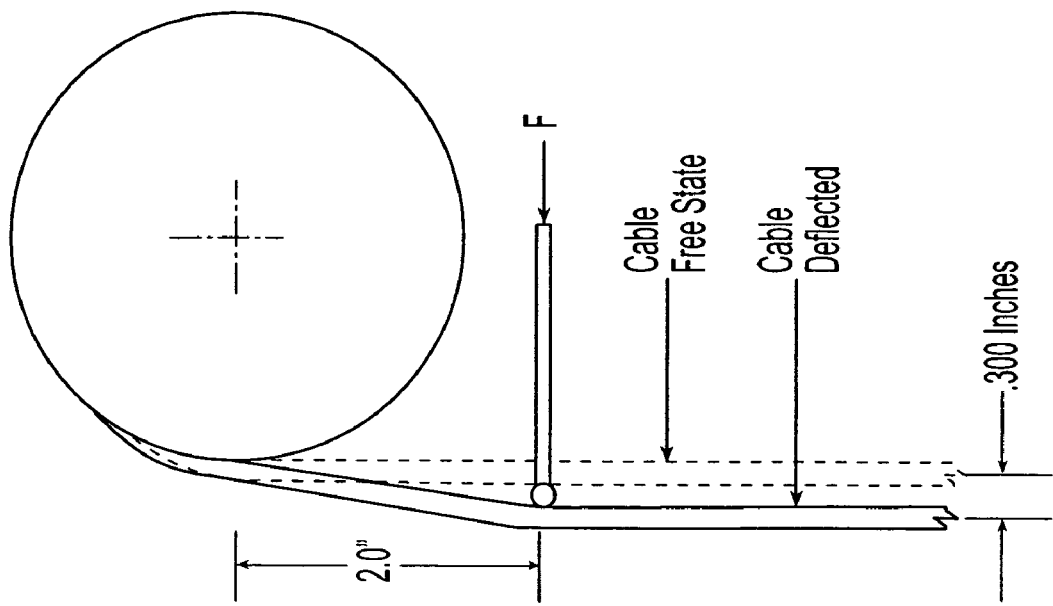
FIG. 5F diagrammatic view showing cable deflection for example 1 of FIGS. 5A and 5D.
Figure 5H:
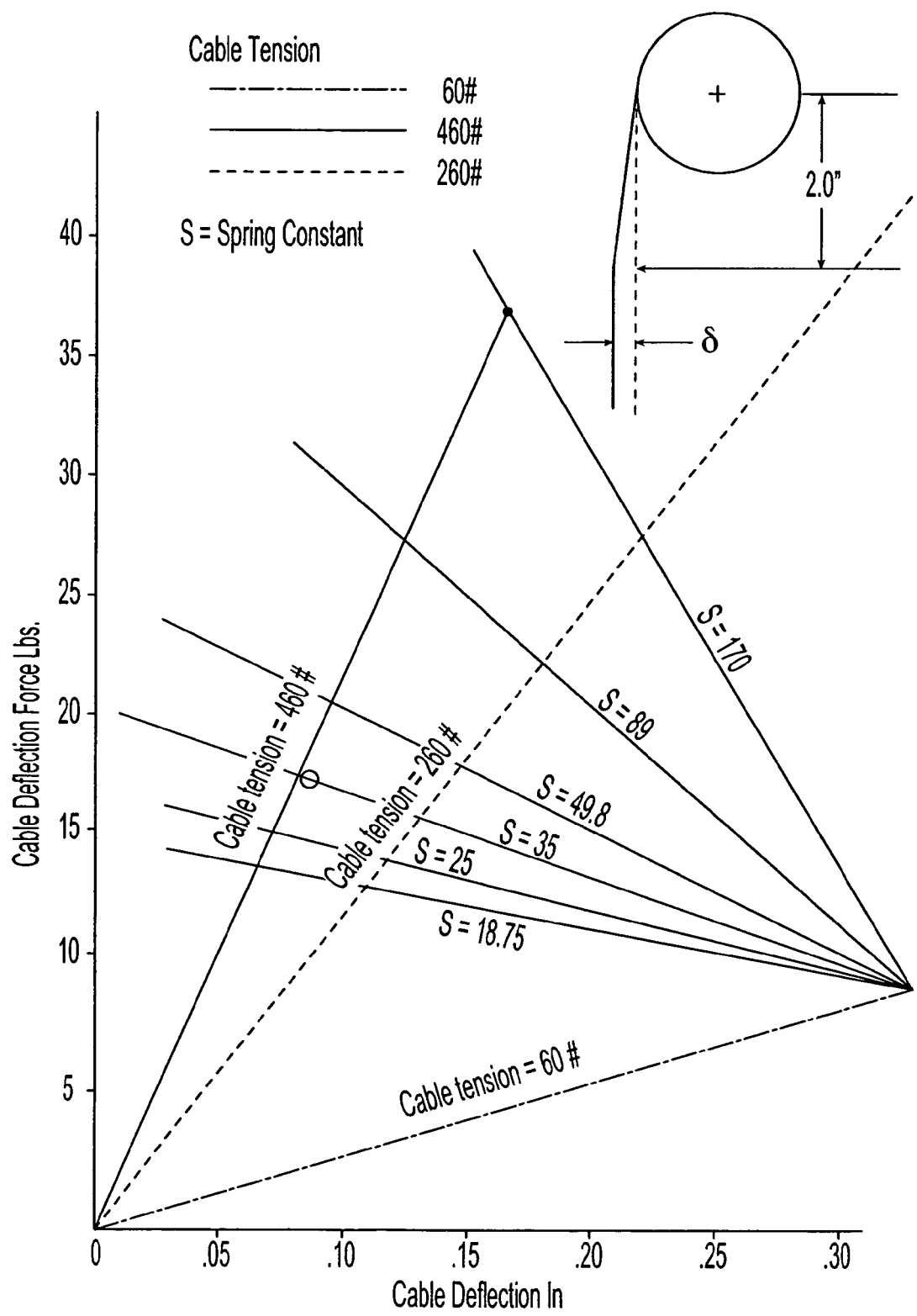
FIG. 5H is a graphical representation of cable deflection force versus cable deflection for various spring constants and cable tensions.
Figure 5I:
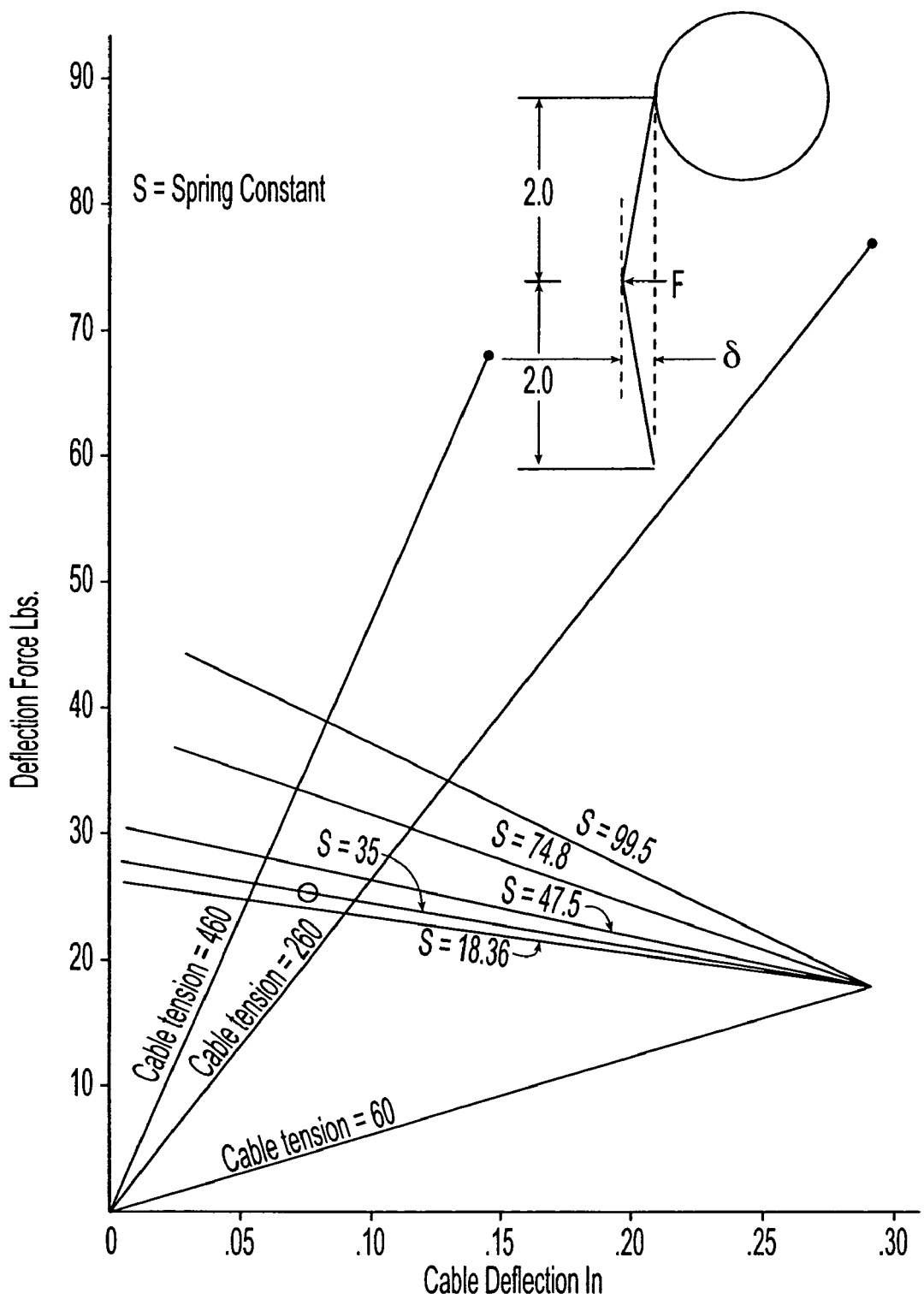
FIG. 5I is a graphical representation of cable deflection force versus cable deflection for various spring constants with ends constrained two inches from the midpoint.

By way of non-limiting examples, FIGS. 5A and 5B show a force at a point two inches below the tangent point of the flexible member 34 with the reel 32 where the spare tire weighs sixty pounds (Example 1). FIG. 5C shows such a force where the tension in the flexible member and the spare tire 11 is four hundred and sixty pounds (Example 2). FIG. 5D shows a free body free body diagram for the flexible member deflection and tension for the first example. FIG. 5E shows a free body diagram for the second example. A comparison of Example 1 and Example 2 is shown in FIGS. 5F and 5G. The relationship between deflection force and cable deflections for various flexible member tension force levels and spring constants where the flexible member 34 is two inches below the tangent point with the reel 32 is shown in FIG. 5H and with the flexible member 34 constrained two inches above and below a mid-point is shown in FIG. 5I. The spring biased probe portion 70 of the tension device 66 is moved into and away from the flexible member 34 as the flexible member 34 is being moved vertically upward to the storing position in the vehicle. The illustrated switch portion 68 is a contact switch or analog sensor that provides a signal that indicates a predetermined level of tension for a known deflection in the flexible member 34. Alternatively, movement of the probe portion is connected to a continuous output transducer that provides a signal that is related to the flexible member tension force. The signal is processed by the ECU 56 which monitors the level of tension force in the flexible member 34 as discussed hereinabove to ensure that the desired flexible member tension force is present in the tire carrier assembly 10 during a tire storage period. Optionally, a carrier of the tension device 66 is formed with a ring portion 76 to encircle the flexible member 34. The ring portion 76 ensures that the flexible member 34 remains in close proximity with the probe portion 70 of the tension device 66 when the flexible member 34 is slack or unloaded.

Optionally, the ECU 56 monitors the flexible member tension device 66 to periodically ascertain the tension level in the flexible member 34 when the tire is in the stored position to ensure that the predetermined desired tension level is maintained in the flexible member 34 and the tire carrier assembly 10. If the flexible member tension level is found to be below a predetermined or threshold force value, the ECU receives a signal from the tension device 66 indicating that a less than desirable flexible member tension force level exists. Then, the ECU 56 sends a signal to the motor 40 to rotate the reel 32 to sufficiently increase the tension in the flexible member 34 to the desired level. Additionally, the ECU 56 may be optionally designed to incorporate various safety devices, such as a park brake switch 80, a key-in switch 82, or the like, to prohibit the lowering of the tire carrier 12 unless an appropriate signal from an operational function condition-monitoring device is received. Examples of such operational conditions include when the engine ignition is turned off, the automatic transmission is in a locked condition, the vehicle wheel speed is zero, the manual transmission gear speed is zero, a park brake is turned off, the key in the ignition switch is turned off, and the vehicle speed is zero. Thus the ECU 56 self-regulates movement of the winch assembly 14 as it moves the spare tire 11 from the accessing position to the stored position.

As discussed hereinabove, the position sensor 60 of the monitoring device 18 senses flexible member movement and ensures that the proper length of the flexible member 34 is unwound from the reel 32 so as to feed out sufficient length to permit the spare tire 11 to be moved to the accessing position to allow the spare tire 11 to be removed from the tire carrier 12. As the spare tire is being lowered, the LED device 62 blinks to indicate operation of the tire carrier assembly 10 to the operator. The LED device 62 remains illuminated while the tire carrier 12 is in the accessing position. Any electrical faults detected by the ECU 56 cause the LED device 62 to remain illuminated and would remain illuminated while the ignition is on or the vehicle transmission is moved from a park position until the fault is cleared or the other operational signals described above are received.

During operation of the tire carrier assembly 10, the spare tire 11 is normally secured in the motor vehicle in the stored position. When the operator desires to lower the spare tire 11 and tire carrier 12 from the storing position to the accessing position, the operator presses operator input device 58 for a predetermined time interval, such as by way of non-limiting example, at least 50 milliseconds in the required direction and then the operator releases the device 58. This causes a signal to be sent to the ECU 56 that sends a signal to start rotation of the motor 40 in one direction. The motor 40 causes the winch shaft 30 to rotate the reel 32 and unwind the flexible member 34 from the reel 32 and through the passage 50 in the bottom of the housing 44 so as to move vertically downward toward the ground surface. The monitoring device 18 senses movement of the flexible member 34 and ensures that the proper length of the flexible member 34 is unwound from the reel 32 so as to feed out sufficient flexible member length to permit the spare tire 11 to be moved from the stowed position to the accessing position (usually on the ground surface) and to allow the spare tire 11 to be removed from the tire carrier 12. As the spare tire 11 is being lowered, the LED device 62 blinks to indicate operation of the tire carrier assembly 10 to the operator. The LED device 62 remains illuminated while the tire carrier 12 is being moved to the accessing position and/or the tire carrier is in the accessing position. Any faults detected by the ECU 56 cause the LED device 62 to remain illuminated and stay illuminated while the ignition is on or the vehicle transmission is moved from a park position, until the fault is cleared.

When the operator desires to raise the spare tire or move the spare tire from the accessing position to the storing position, the operator presses the operator input device 58 in the required direction for a predetermined time interval, such as by way of non-limiting example, at least fifty milliseconds and then releases the input device 58. The device 58 sends a signal to the ECU 56 that sends a signal to start rotation of the motor 40 in another or reverse direction. This permits the flexible member 34 to wind around the reel 32. The position sensor 60 monitors the rotation of the reel 32 to ensure that the proper length of flexible member 34 is wound on the reel 32 so as to take up a sufficient length to permit the spare tire 11 to be moved from the accessing position to the storing position. A the tire carrier 12 is being raised from the accessing position to the storing position, the LED device 62 blinks to indicate operation of the tire carrier assembly 10 to the operator. The LED device 62 remains illuminated until the tire carrier is in the storing position.

The flexible member 34 retracts until a predetermined length is wound on the reel 32 as determined by a signal from the position sensor 60. Optionally, the flexible member tension level is limited by the ECU 56 during initial flexible member retraction in order to prevent or reduce the possibility of trapping a person or other obstruction between the spare tire 11 and the vehicle. The ECU 56 does this by monitoring changes in the signal from the position sensor 60 and/or changes in a signal corresponding to the motor current as measured within the ECU 56 and causing the motor 40 to stop rotating the reel 32 when the signal exceeds a predetermined threshold level. Further optionally in the above situation, the motor 40 can be made to reverse rotation of the motor 40 by the ECU 56 to cause the motor 40 to lower the tire carrier to the accessing position, such as for example, if the ECU 56 detects an abnormal operational condition.

Figure 6:
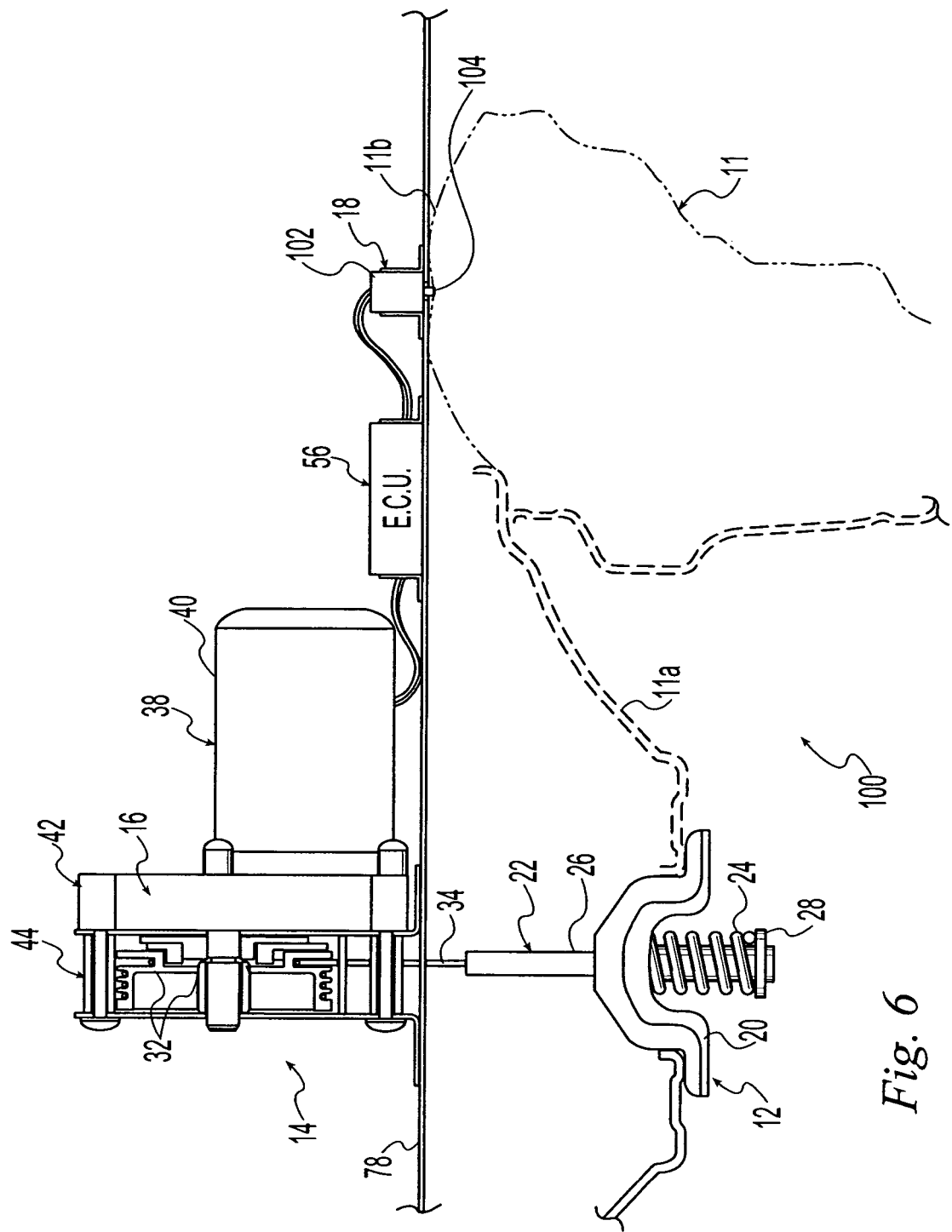
FIG. 6 is an elevational view of a tire carrier assembly according to an alternative preferred embodiment of the present invention.

FIG. 6 illustrates a tire carrier assembly 100 according to an alternative preferred embodiment of the present invention. The tire carrier assembly 100 is substantially the same as the tire carrier assembly 10 described hereinabove in detail and the same reference numbers are utilized to indicate the same structure as previously described except as now noted. In this embodiment, the monitoring device 18 includes a force switch 102 that is mounted to the vehicle floor pan 78. The force switch 102 is positioned so as to be aligned with the axis of travel 74 of the flexible member 34 and to interact with the spare tire 11. The illustrated force switch 102 has a spring-loaded micro switch with a plunger 104 extending down from its body. The tip of the plunger 104 of the force switch 102 has a bearing surface of a predetermined area so that when it is struck by another object, the force of the object striking the plunger is measured. Thus, when the flexible member 34 raises the spare tire 11, the spare tire 11 moves against the tip of the plunger 104. As the spare tire 11 continues its upward movement, the force switch 102 generates a signal that is proportional to the force of the abutting surface of the spare tire 11, such as the tire side wall 11b. Such a force switch 102 is well known in the art. When the tip of the plunger 104 contacts the tire surface, the spare tire 11 strikes the plunger 104 and any further upward movement of the tip beyond a certain predetermined deflection causes the force switch 102 to send a signal to the ECU 56 that is proportional to the upward force of the flexible member 34. When the upward force exceeds a predetermined force, a signal is sent to the ECU 56 to stop rotation of the motor 40 and the upward travel of the flexible member 34. Optionally, the tip may include a membrane or other area interacting device to measure the force against the force switch 102. Alternatively, the monitoring device 18 includes a limit switch. When the plunger contacts the spare tire 11, the spare tire 11 and any further movement of the plunger causes the limit switch to send a signal to the ECU 56 to stop the rotation of the motor 40 and the upward movement of the flexible member 34 onto the reel 32. In all other aspects, the tire carrier assembly 100 operates as in the prior described tire carrier assembly 10.

Figure 7:
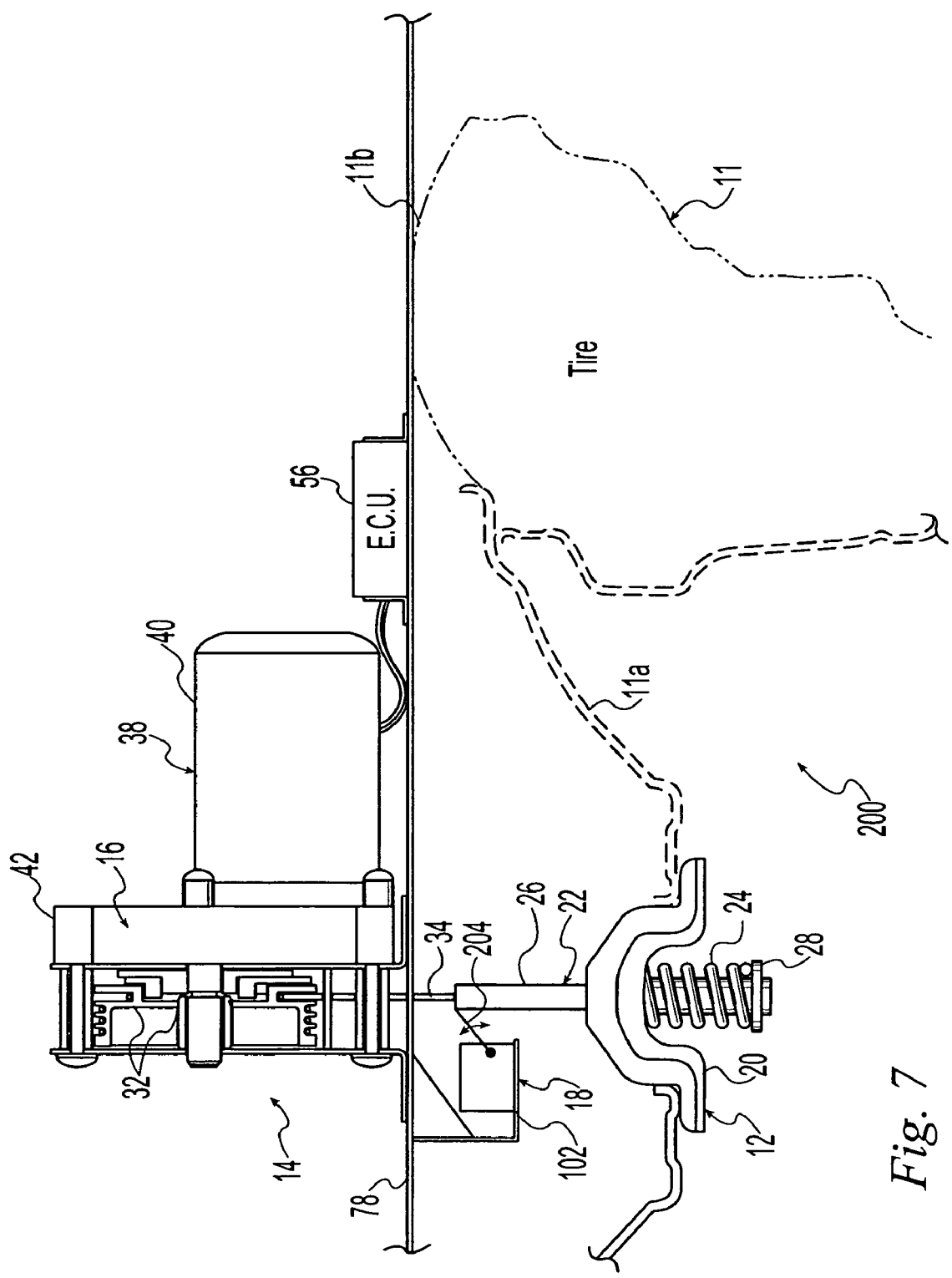
FIG. 7 is an elevational view of a tire carrier assembly according to another alternative preferred embodiment of the present invention.

FIG. 7 illustrates a tire carrier assembly 200 according to another alternative preferred embodiment of the present invention. The tire carrier assembly 200 is substantially the same as the tire carrier assembly 10 described hereinabove in detail and the same reference numbers are utilized to indicate the same structure as previously described except as now noted. In this embodiment, the monitoring device 18 includes a limit switch 202. The limit switch 202 is mounted to the bottom of housing 44 adjacent to but spaced away from the passage 50 in the housing 44 so as to permit the limit switch 202 to interact with the tubular portion 26 of the swivel 22. The illustrated limit switch 202 has a spring loaded micro switch with a pivotably mounted plunger 204 extending from its body. The limit switch 202 is positioned adjacent to the travel of the flexible member 34 so that the plunger 204 interacts with the swivel 22 or the tire plate 20 as the flexible member 34 is raised. When the upward movement of the swivel 22 reaches a predetermined position adjacent the passage in the housing, the swivel 22 strikes the plunger 204 of the limit switch 202 and any further movement of the flexible member 34 causes the plunger 204 to pivot. Optionally, the plunger 204 includes a ring member that surrounds and captures the flexible member 34. As a result, when the plunger 204 of the limit switch 202 us moved pivotally, it sends a signal to the ECU 56 to stop rotation of the motor 40 and the upward movement or motion of the flexible member 34 onto the reel 32. It is noted that the illustrated limit switch 202 is positioned to engage the swivel 22, the limit switch can alternatively be positioned to contact other surfaces. In all other aspects, the tire carrier assembly 200 operates as the earlier described tire carrier assembly 10.

Figure 8:
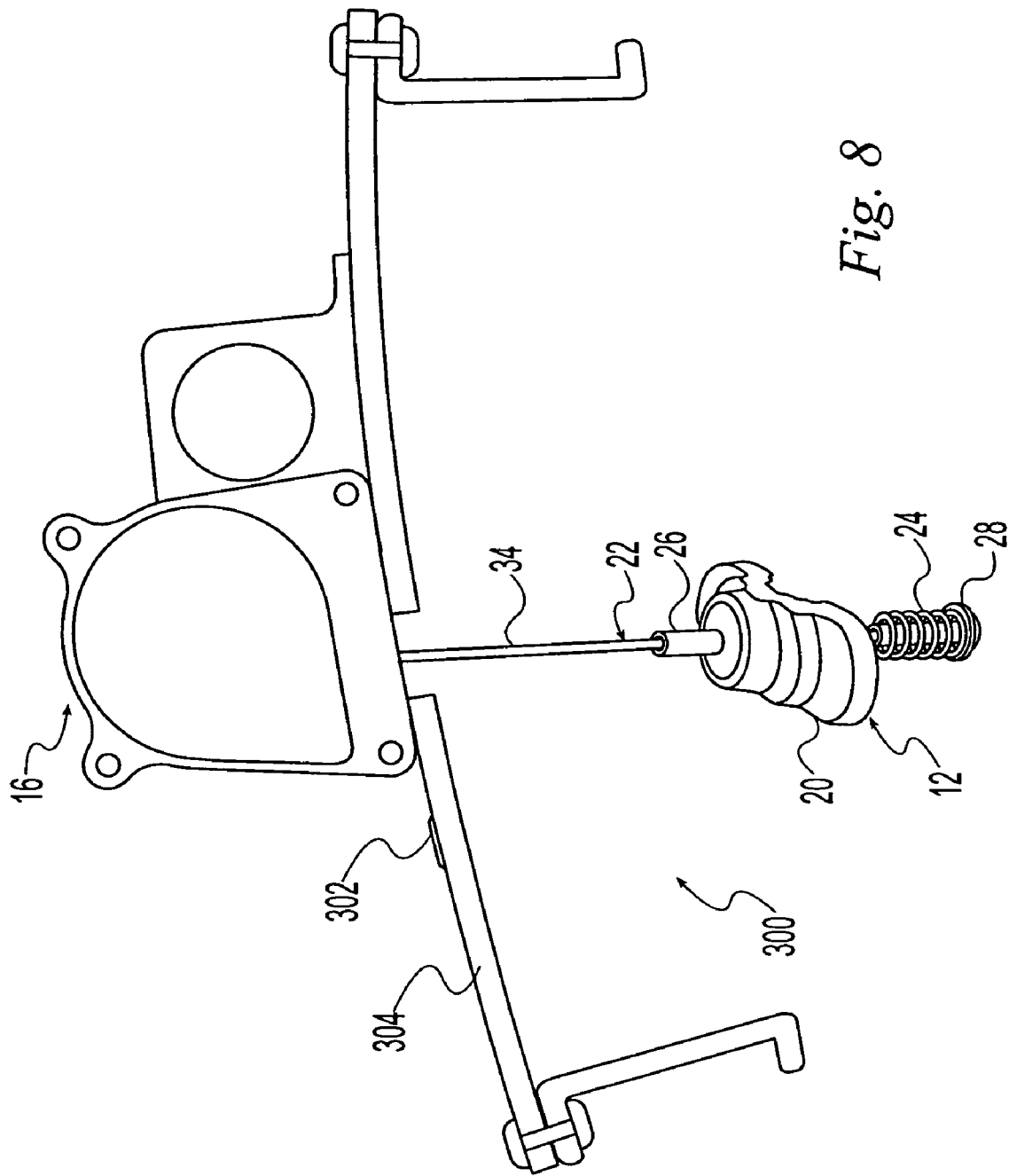
FIG. 8 is an elevational view of a tire carrier assembly according to another alternative preferred embodiment of the present invention.

FIG. 8 illustrates a tire carrier assembly 300 according to another alternative preferred embodiment of the present invention. The tire carrier assembly 300 is substantially the same as the tire carrier assembly 10 described hereinabove in detail and the same reference numbers are utilized to indicate the same structure as previously described except as now noted. In this embodiment, the monitoring device 18 includes a stress monitoring device 302. The stress monitoring device can include any conventionally known devices such as a strain gage. The use of strain gages to measure stress in a support structure or load bearing component is well known in the art. The illustrate strain gage 302 is preferably bonded at a high strain area to measure the stretching or compressing of a support structure such as, by non-limiting example, the support member 304. The resistance of strain gage 302 changes as the support member 304 stretches or compresses in response to various load changes to provide an output signal proportional to the tension level of the flexible member 34. When the spare tire 11 are supported by the tire plate 20, the weight of the spare tire 11 and rim 11a on a stretched flexible member 34 forms a tension force in the flexible member 34. The tension force is transmitted to the support member 304 as a tension or compression load. When the flexible member 34 nears the end of its retraction travel or its storing position, as determined by the position sensor 60, the stress monitoring device 302 is activated and monitored by the ECU 56. As the tension in the flexible member 34 increases, the resistance in gage 302 changes in proportion to the strain in the support member 304. The strain gage 302 is connected to a Wheatstone Bridge in a well-known manner to detect changes in resistance level in the strain gage 302. The ECU monitors the resistance in the strain gage 302 and when the resistance reaches a predetermined level, the ECU sends a signal to stop operation of the motor 40.

It has been found to be preferable that the strain gage 302 be pre-bonded to a metal substrate to facilitate its attachment to the support member 304. Suitable strain gages 302 are available from Vishay Measurement Group of Raleigh, N.C.

The ECU 56 preferably monitors the stress monitoring device 302 periodically to ascertain the tension level in the flexible member 34 while the spare tire 11 is in the storing position to ensure that the desired tension is maintained in the flexible member 34 and the assembly 300. If the flexible member tension is found to be below a threshold force value, the ECU 56 sends a signal to the motor 40 to rotate the reel 32 and increase the tension in the flexible member 34 to the desired level. In all other aspects, the tire carrier assembly 300 operates as the earlier described tire carrier assembly 10.

Figure 9:
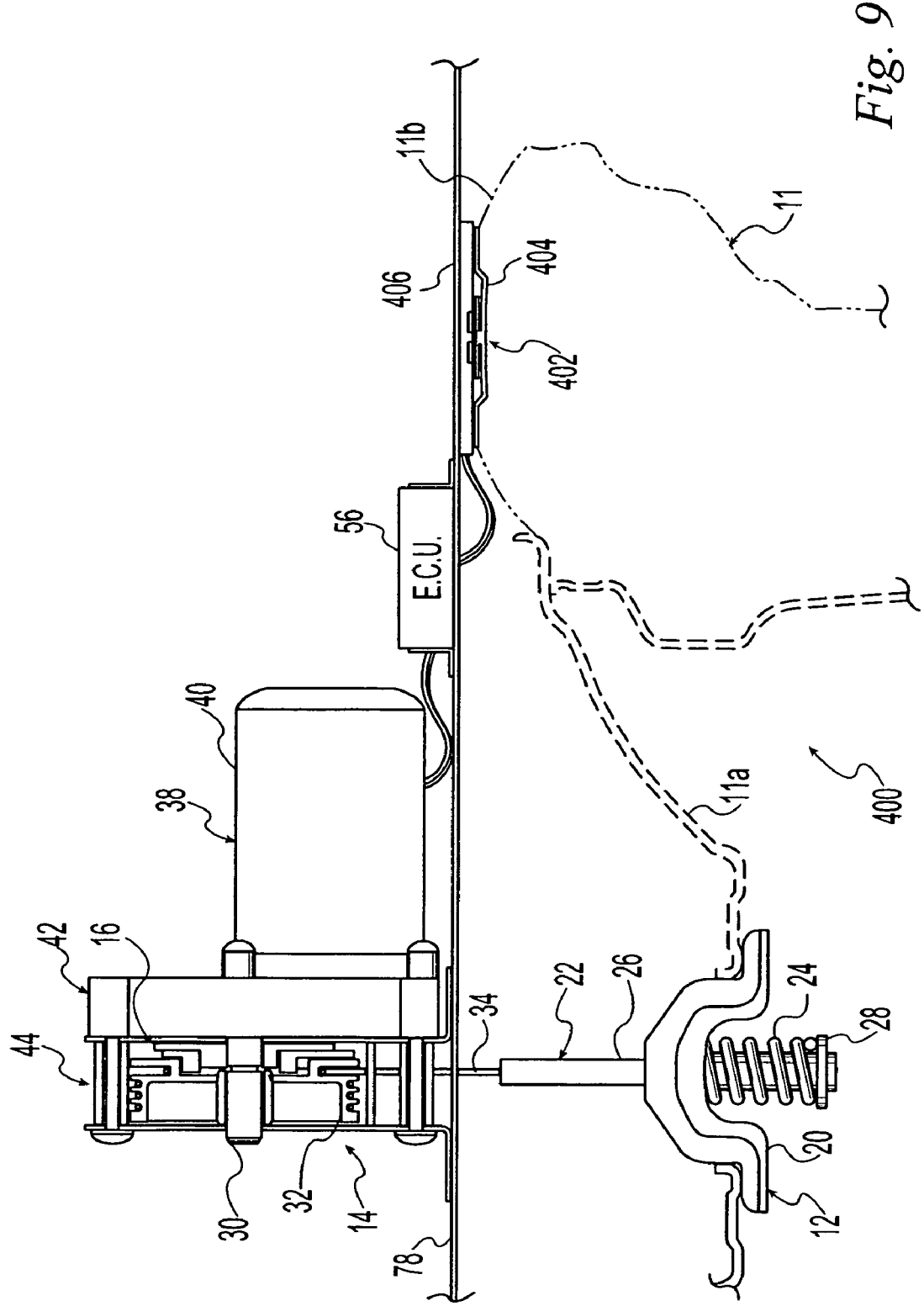
FIG. 9 is an elevational view of a tire carrier assembly according to another alternative preferred embodiment of the present invention.
Figure 10:
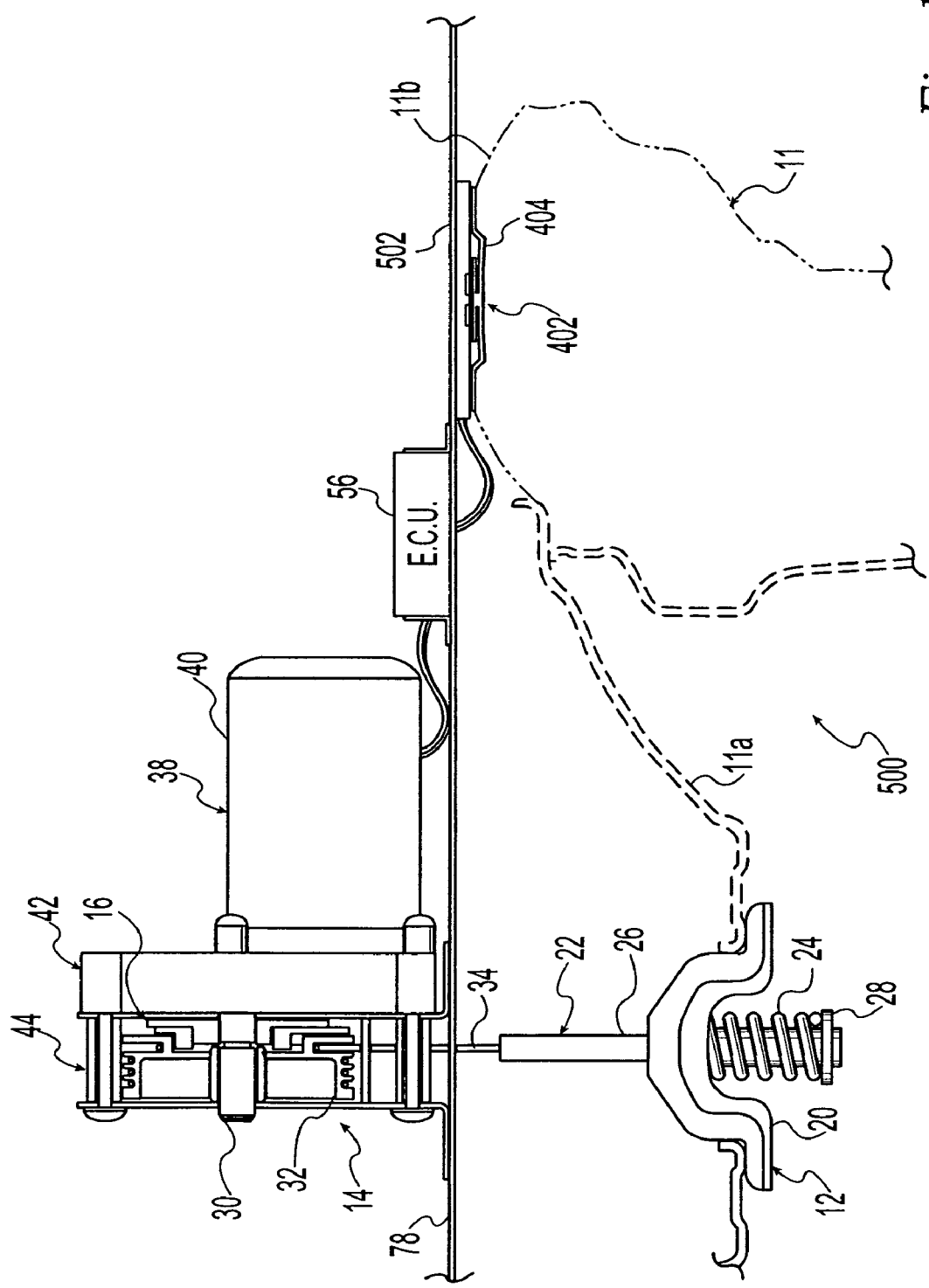
FIG. 10 is an elevational view of a tire carrier assembly according to another alternative preferred embodiment of the present invention.

FIGS. 9 and 10 illustrate tire carrier assemblies 400 and 500 according to additional alternative preferred embodiments of the present invention. The tire carrier assemblies 400 and 500 are substantially the same as the tire carrier assembly 10 described hereinabove in detail and the same reference numbers are utilized to indicate the same structure as previously described except as now noted. In this embodiment, the monitoring device 18 includes a pressure sensor assembly 402 that is mounted to the vehicle floor pan 78 to interact with the spare tire 11 when near its stored position. The pressure sensor assembly 402 includes a diaphragm 404 and can take many forms including a pressure switch 406 and a pressure sensor 502. One such pressure sensor assembly 402 uses a transistor such as, by way of non-limiting example, described in U.S. Pat. Nos. 6,388,299 and 4,873,871, the disclosures of which are expressly incorporated herein in their entireties by reference. Another pressure sensor assembly uses a semiconductor pressure transducer such as, by way of non-limiting example, described in U.S. Pat. No. 4,812,888, the disclosure of which is expressly incorporated herein in its entirety by reference. Yet another pressure sensor assembly uses a piezoresistive sensor such as, by way of non-limiting example, a sensor available Kristal Instruments AG, of Winterhur, Switzerland. When the flexible member 34 is used to raise the spare tire 11, the side wall 11b of the spare tire 11 touches the diaphragm 404 of the pressure sensor assembly 402. As the spare tire 11 continues its upward movement, the pressure sensor assembly 402 generates a signal that is proportional to the force if the abutting surface of the spare tire 11. Any further upward movement beyond a certain predetermined pressure level causes the pressure switch 406 to act as a limit switch and send a signal to the ECU 56 to stop rotation of the motor 40 and the upward travel of the flexible member. Alternatively, if the sensor assembly 402 is a pressure sensor 502, the sensor assembly 402 acts as a pressure sensor to provide a signal that is proportional to the pressure sensed by the pressure sensor 502. The ECU 56 preferably continues to monitor the pressure sensor 502 once the tire carrier 12 is in the storing position and in the event that the pressure level sensed by the pressure sensor 502 falls below a threshold pressure level, the ECU 56 receives a signal from the pressure sensor 502 indicating that a less than desirable pressure is being exerted by the spare tire 11 against the diaphragm 404. Then, the ECU 56 sends a signal to the motor 40 to rotate the reel 32 to raises the spare tire 11 so that the spare tire 11 exerts a sufficient increase in pressure to the desired predetermined pressure level. In other aspects, the carriers 400, 500 operate the same as the earlier described tire carrier assembly 10.

Figure 11:
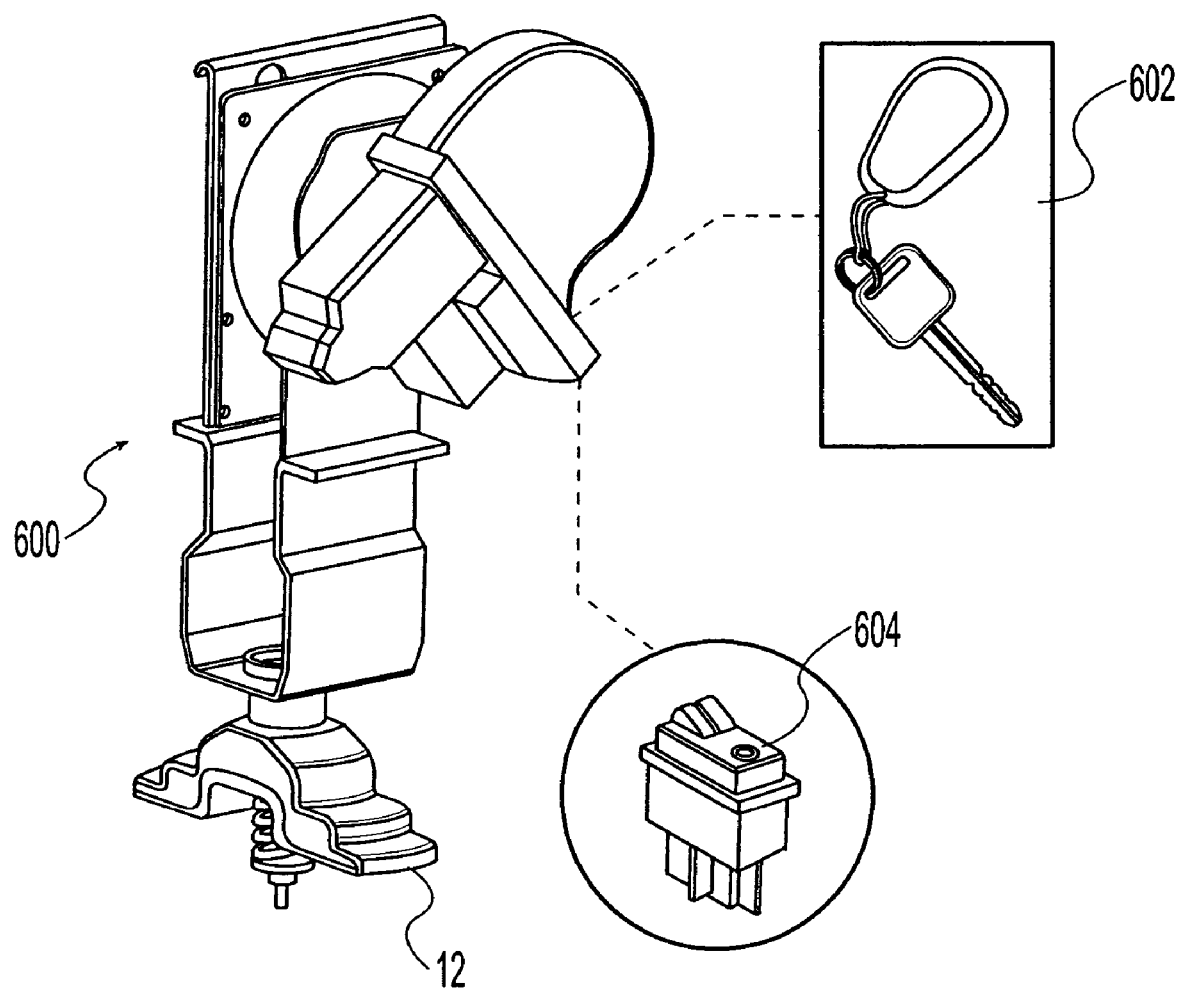
FIG. 11 is a diagrammatic view of a tire carrier assembly according to another alternative preferred embodiment of the present invention.

FIG. 11 illustrates a tire carrier assembly 600 according to another alternative preferred embodiment of the present invention. The tire carrier assembly 600 is substantially the same as the tire carrier assembly 10 described hereinabove in detail and the same reference numbers are utilized to indicate the same structure as previously described except as now noted. In this embodiment, the operator input device 58 includes a wireless key remote 602 in addition to a hard wired toggle switch 604. The operator can use either the wireless key remote o the hard wired toggle switch to raise or lower the tire carrier. The wireless key remote functions in the same manner as known remotes for operating vehicle locks and the like. In all other aspects, the tire carrier assembly 600 operates as the earlier described tire carrier assembly 10.

Figure 12:
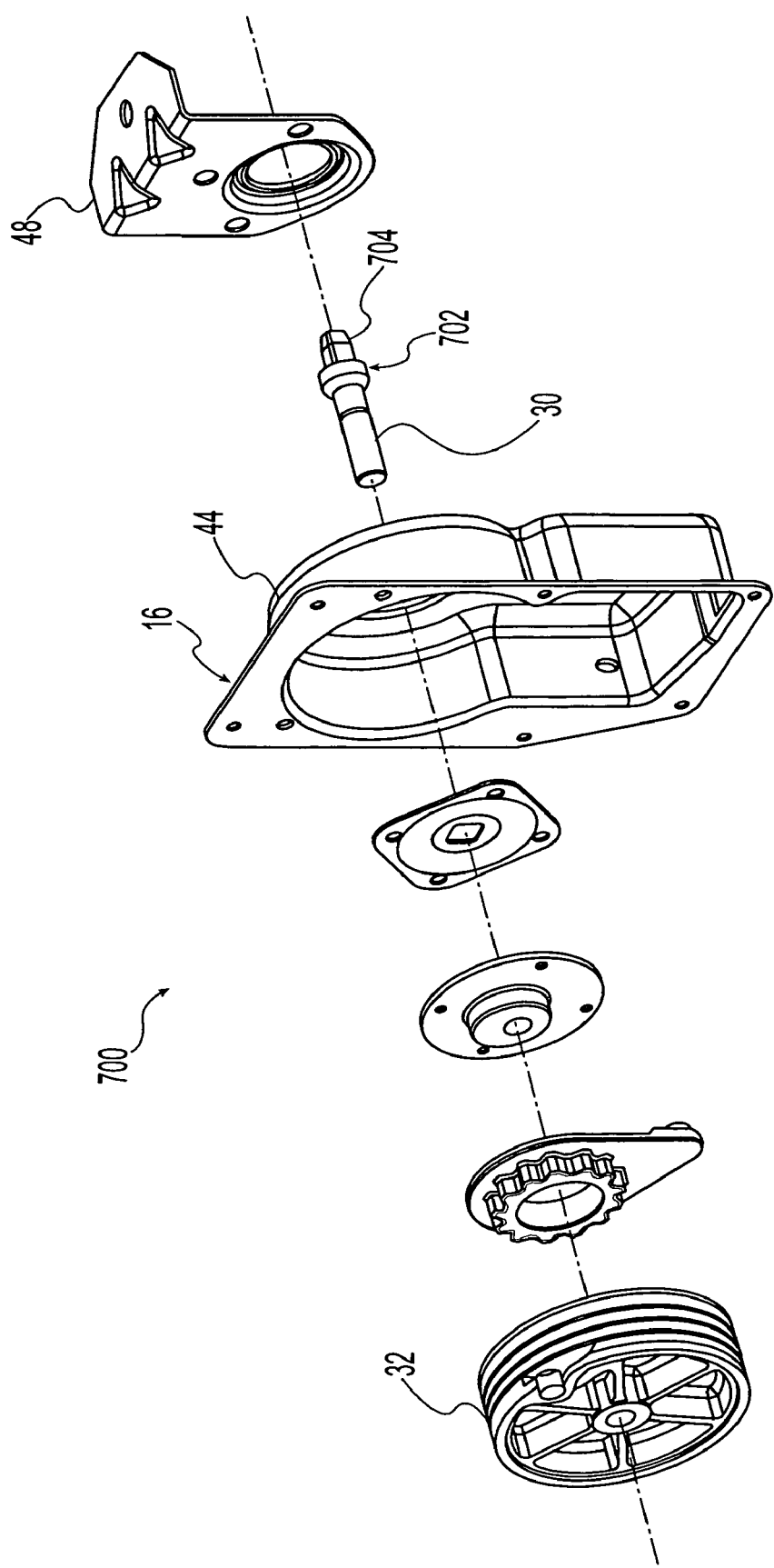
FIG. 12 is an exploded perspective view of a tire carrier assembly according to another alternative preferred embodiment of the present invention.
Figure 13:
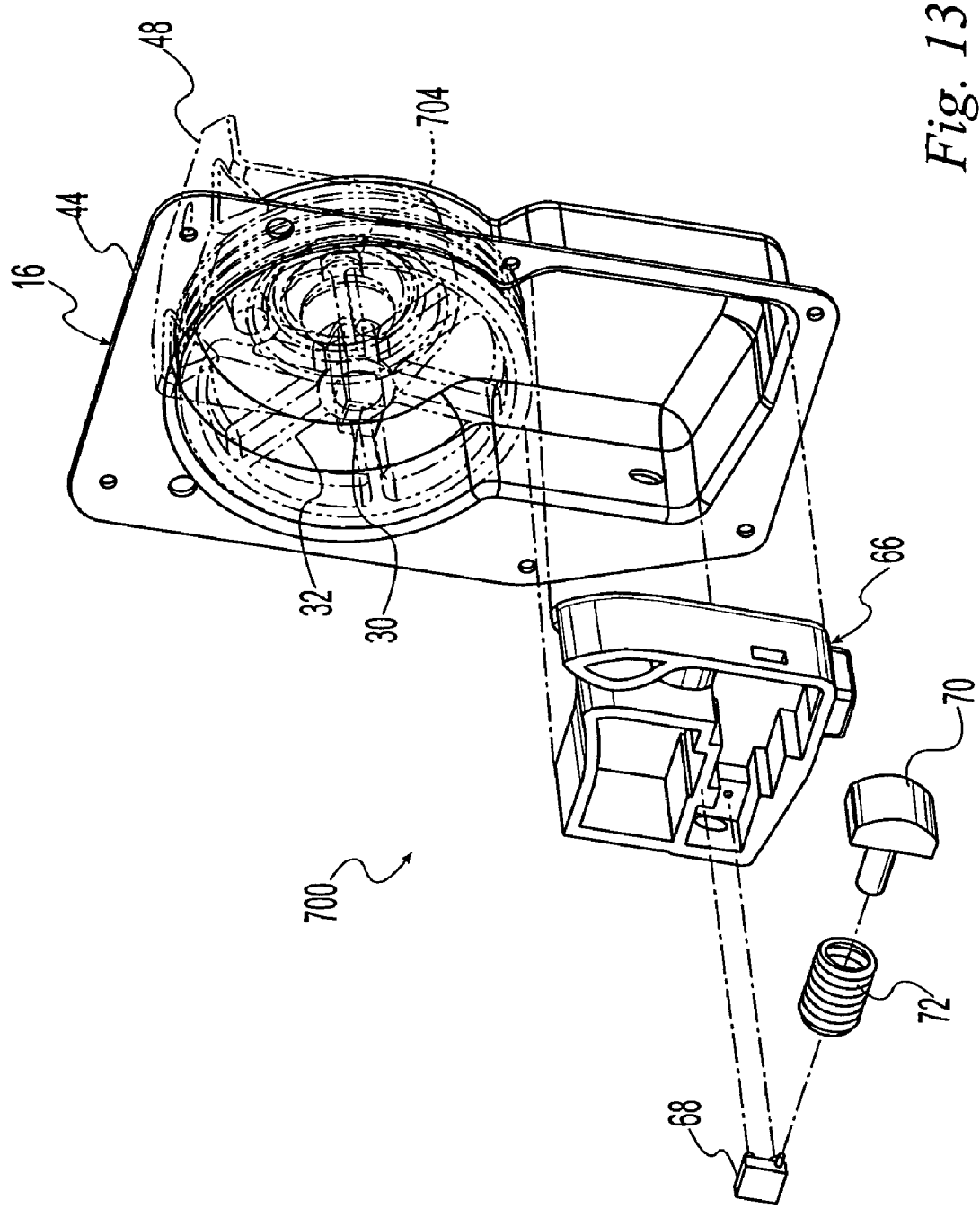
FIG. 13 is a partially exploded view of the tire carrier assembly of FIG. 12.

FIGS. 12 and 13 illustrate a tire carrier assembly 700 according to another alternative preferred embodiment of the present invention. The tire carrier assembly 700 is substantially the same as the tire carrier assembly 10 described hereinabove in detail and the same reference numbers are utilized to indicate the same structure as previously described except as now noted. In this embodiment, the actuation member 38 for the winch assembly 14 is a manual device 702 rather than the motor 40. The illustrated manual device includes a driver head 704 formed in the end of the shaft 30. The driver head 704 is sized and shaped to cooperate with a drive lever or handle so that the operator can manually rotate the shaft 30 and the reel 32 using the drive lever in order to manually raise and lower the tire carrier. The tension device 66 is utilized to trigger the warning lamp 64 when the flexible member does not have the predetermined tension level. In all other aspects, the tire carrier assembly 700 operates as the earlier described tire carrier assembly 10.

Figure 14:
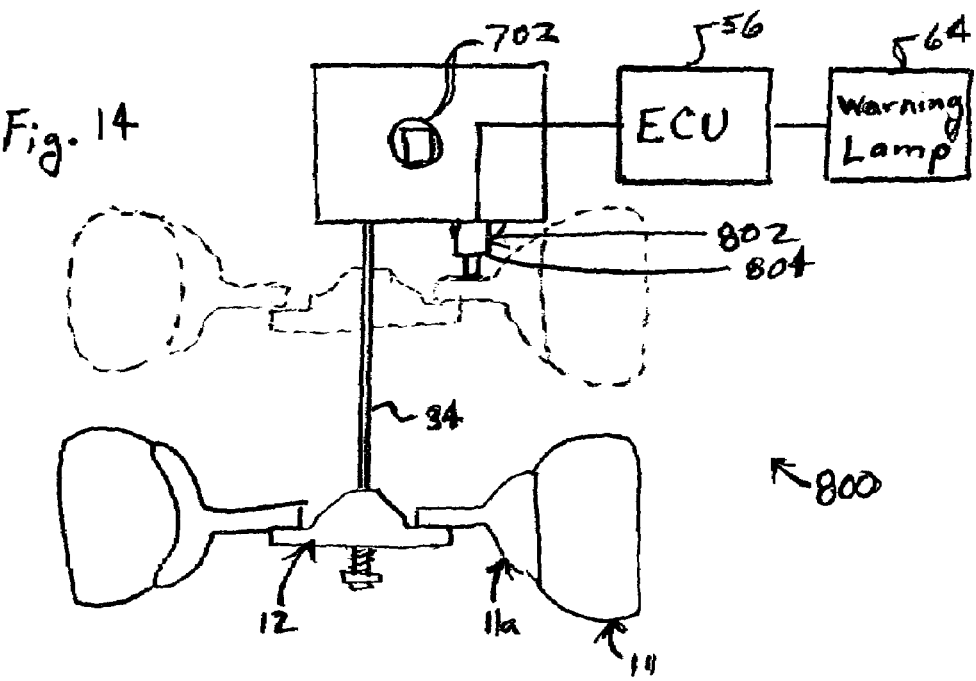
FIG. 14 is a diagrammatic view of a tire carrier assembly according to another alternative preferred embodiment of the present invention.

FIG. 14 illustrates a tire carrier assembly 800 according to another alternative preferred embodiment of the present invention. The tire carrier assembly 800 is substantially the same as the tire carrier assembly 10 described hereinabove in detail and the same reference numbers are utilized to indicate the same structure as previously described except as now noted. In this embodiment, the actuation member 38 for the winch assembly 14 is a manual device 702 rather than the motor 40 just as the tire carrier 700 of the previous embodiment. The illustrated manual tire carrier 800 includes a travel or position sensor 802 for sensing the presence of the tire carrier 12 in the upper or storing position. The illustrated sensor 802 is a limit switch 804 or other suitable contact switch or sensor. The illustrated limit switch 804 is located to be engaged by the rim or wheel 11a of the tire assembly 11 when the carrier 12 is in the storing position with the wheel assembly 11 supported thereon. It is noted that the limit switch can alternatively be located to be engaged by any other suitable component such as, for example, the carrier 12. The sensor 802 is operably connected to a warning indicator such as the illustrated check spare tire lamp 64 so that the warning indicator is activated whenever the tire carrier 12 is out of the storing position and deactivated whenever the tire carrier 12 is located in the storing position and activating the switch 804. As the illustrated tire carrier 12 is manually raised by the operator, the lamp 64 is illuminated until the tire carrier 12 reaches the storing position and activates the switch 804. With the switch 804 activated, the switch 804 deactivates the lamp 64 so that the lamp 64 is no longer illuminated, and the operator can visually see an indication that the tire carrier 12 is completely stowed in the storing position and so that the operator knows to cease manual rotation of the manual device 702. If at any time the tire carrier 12 moves out of the storing position due to cable stretch, component malfunction, or the like, the switch is deactivated and as a result the lamp 64 is illuminated so that the operator is provided with a visual warning of the undesirable situation. It is noted that the warning indicator can alternatively be any other suitable visual and/or auditory indicator.

Figure 15:
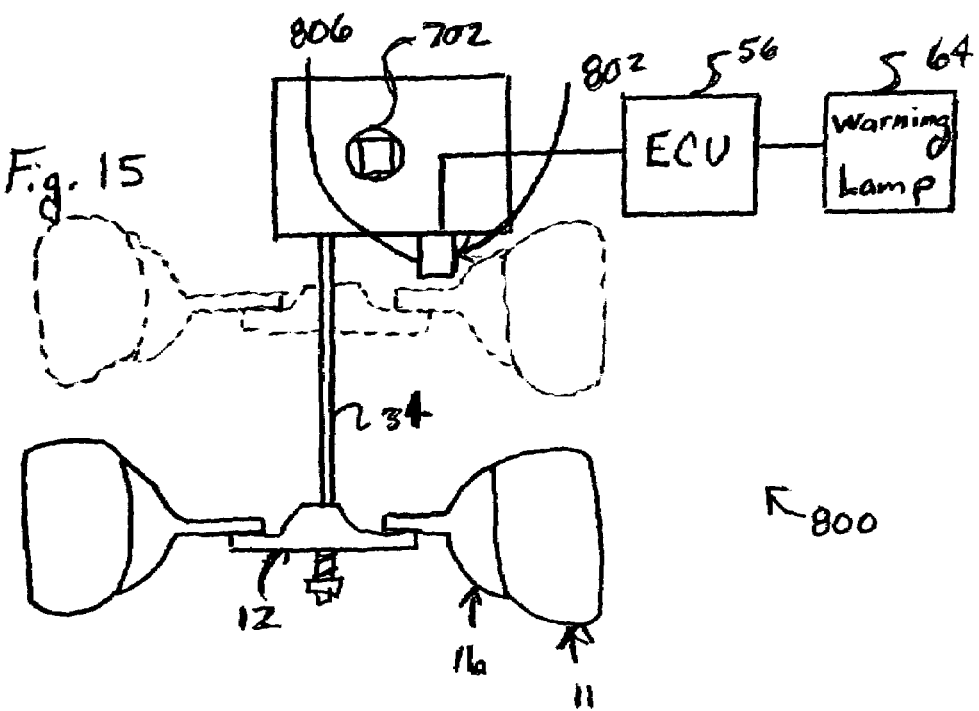
FIG. 15 is a diagrammatic view of a tire carrier assembly according to a variation of the embodiment of FIG. 14.

FIG. 15 illustrates a variation of the tire carrier assembly 800 wherein the travel or position sensor 802 is a proximity switch 806 or other suitable non-contact switch. The proximity switch 706 can be a Hall-effect sensor or the like. This variation illustrates that the position sensor 802 can be any suitable type of sensor, switch or the like.

From the foregoing disclosure and detailed description of certain preferred embodiments of the present invention, it is apparent that the features of each the various embodiments can be utilized in combination with each of the other embodiments.

From the foregoing disclosure and detailed description of certain preferred embodiments of the present invention, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tire carrier assembly for storing a spare tire on a vehicle, said tire carrier assembly comprising, in combination:
   a carrier adapted for supporting the spare tire;
   a winch operatively connected to the carrier to raise and lower the carrier between a stowed position wherein the carrier is inaccessible and a deployed position wherein the carrier is accessible;
   a sensor located to be activated when the carrier is in the stowed position;
   a warning indicator operably connected to the sensor so that the warning indicator is activated when the carrier is out of the stowed position and the sensor is not activated;
   wherein the winch includes a flexible member connected to the carrier to raise and lower the carrier;
   a monitoring device adjacent the flexible member to measure tension in the flexible member; and
   a control module operably connected to the monitoring device to monitor a tension force level in the flexible member.

2. The tire carrier assembly according to claim 1, wherein the winch includes a rotatable shaft, a reel rotatable with the shaft, and wherein the elongate flexible member extends between the reel and the carrier so that the flexible member is wound and unwound upon the reel respectively when the shaft rotates in opposite directions.

3. The tire carrier assembly according to claim 2, wherein the actuation member is an electric motor operably connected to the shaft for operating the winch to raise and lower the carrier.

4. The tire carrier assembly according to claim 2, wherein the shaft of the winch does not have an electric motor connected thereto so that the shaft must be manually rotated to operate the winch and raise and lower the carrier, and the actuation member is a manual device operably connected to the shaft for manually operating the winch to raise and lower the carrier.

5. The tire carrier assembly according to claim 1, wherein the monitoring device engages and deflects the flexible member and determine the tension force level in the flexible member.

6. The tire carrier assembly according to claim 1, wherein the monitoring device includes a switch portion and a biased probe engaging the flexible member the flexible member.

7. The tire carrier assembly according to claim 1, wherein the sensor is a limit switch.

8. The tire carrier assembly according to claim 1, wherein the sensor is a proximity switch.

9. The tire carrier assembly according to claim 1, wherein the sensor is a force switch.

10. The tire carrier assembly according to claim 1, wherein the sensor is a pressure sensor.

11. The tire carrier assembly according to claim 1, wherein the sensor engages a portion of the spare tire to indicate when the carrier is in the stowed position.

12. The tire carrier assembly according to claim 1, wherein the sensor engages a portion of the carrier to indicate when the carrier is in the stowed position.

13. The tire carrier assembly according to claim 1, wherein the warning indicator is a warning lamp.

* * * * *